United States Patent [19]
Brown

[11] Patent Number: 5,367,294
[45] Date of Patent: Nov. 22, 1994

[54] INFLATABLE SECURITY MANNEQUIN

[76] Inventor: Edwin B. Brown, 3550 Calle Principal, Chico, Calif. 95926

[21] Appl. No.: 16,997

[22] Filed: Feb. 12, 1993

[51] Int. Cl.$^5$ .............................................. G08B 15/00
[52] U.S. Cl. .................... 340/692; 340/574; 340/691; 446/226
[58] Field of Search ............... 340/692, 691, 574; 446/226

[56] References Cited

U.S. PATENT DOCUMENTS

| | | | |
|---|---|---|---|
| 3,672,083 | 6/1972 | Moran | 446/220 |
| 4,055,020 | 10/1977 | Kosicki et al. | 446/226 |
| 4,212,007 | 7/1980 | Reyes et al. | 340/692 |
| 4,259,805 | 4/1981 | Hornsby, Jr. | 446/198 |
| 4,820,231 | 4/1989 | Mikitka et al. | 446/73 |
| 4,895,546 | 1/1990 | Rakonjac | 446/221 |
| 5,125,177 | 6/1992 | Colting | 446/226 |

*Primary Examiner*—Glenn Swann

[57] ABSTRACT

An inflatable member sits on a motor vehicle seat and can be seen from outside through a vehicle window. The inflatable member is in the form of a simulated living creature. An electrically powered air pump is provided for inflating the inflatable member. A switch, under operator control, is provided for activating the air pump. An electrically powered device is provided for emitting sound, and, under operator control, a switch is provided for activating the sound-emitting device. The air pump and the sound-emitting device include a plug which is adapted to fit into a cigarette lighter in a motor vehicle. The sound-emitting device includes recorded-sound media, such as a cassette tape, a cassette player, and a speaker. The speaker is housed in the inflatable member, and the cassette tape player is housed in a box separate from the inflatable member. More specifically, the box houses the air pump, the cassette player, and the operator-controlled switches for the air pump and the cassette player. The operator-controlled switch for activating the cassette player includes a push-button, momentary contact switch. A potential perpetrator of a criminal act may be deterred from committing the act by seeing and hearing the apparatus of the invention.

13 Claims, 4 Drawing Sheets

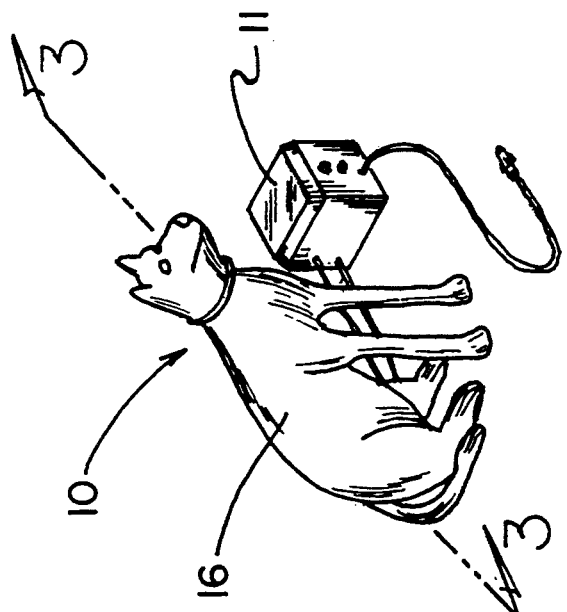
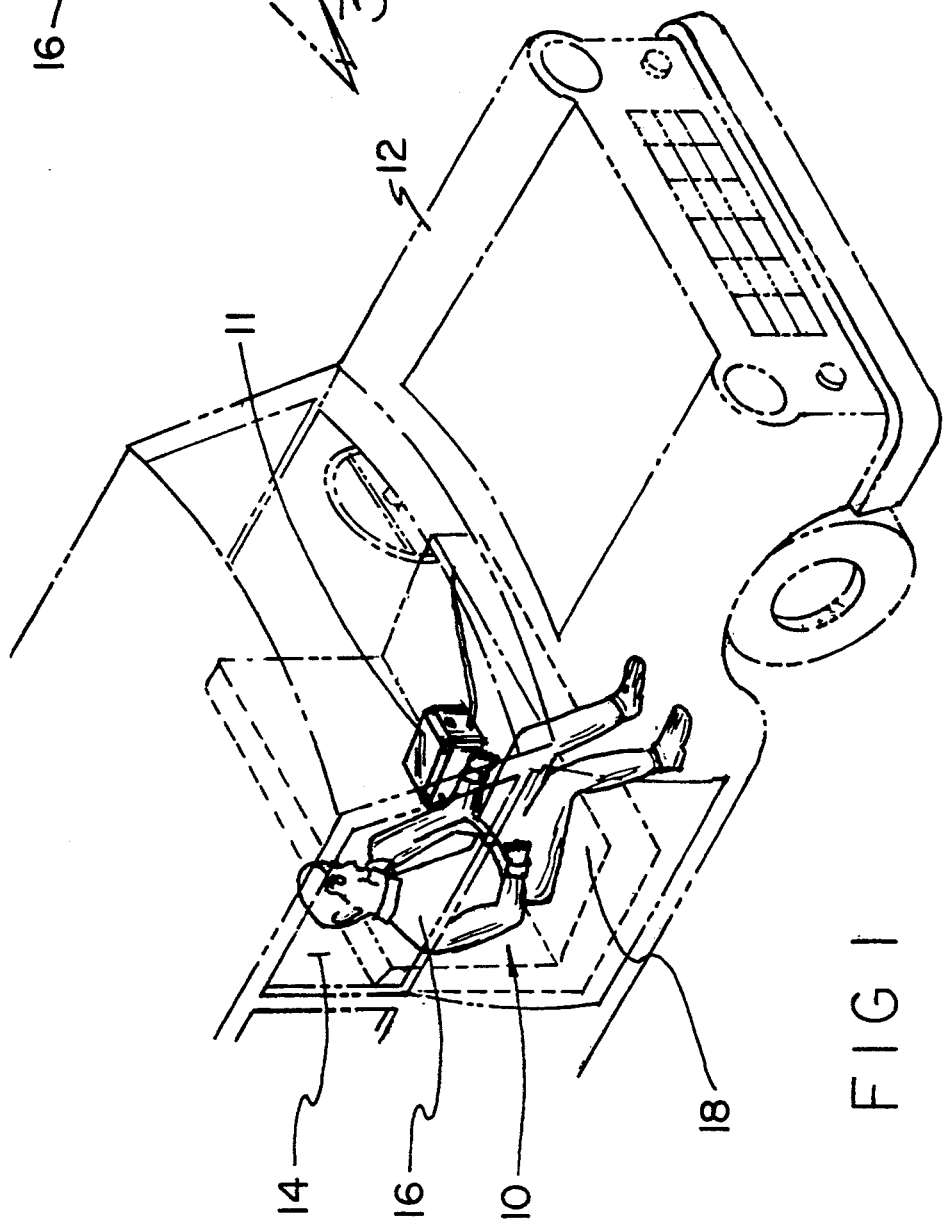
FIG. 2
FIG. 1

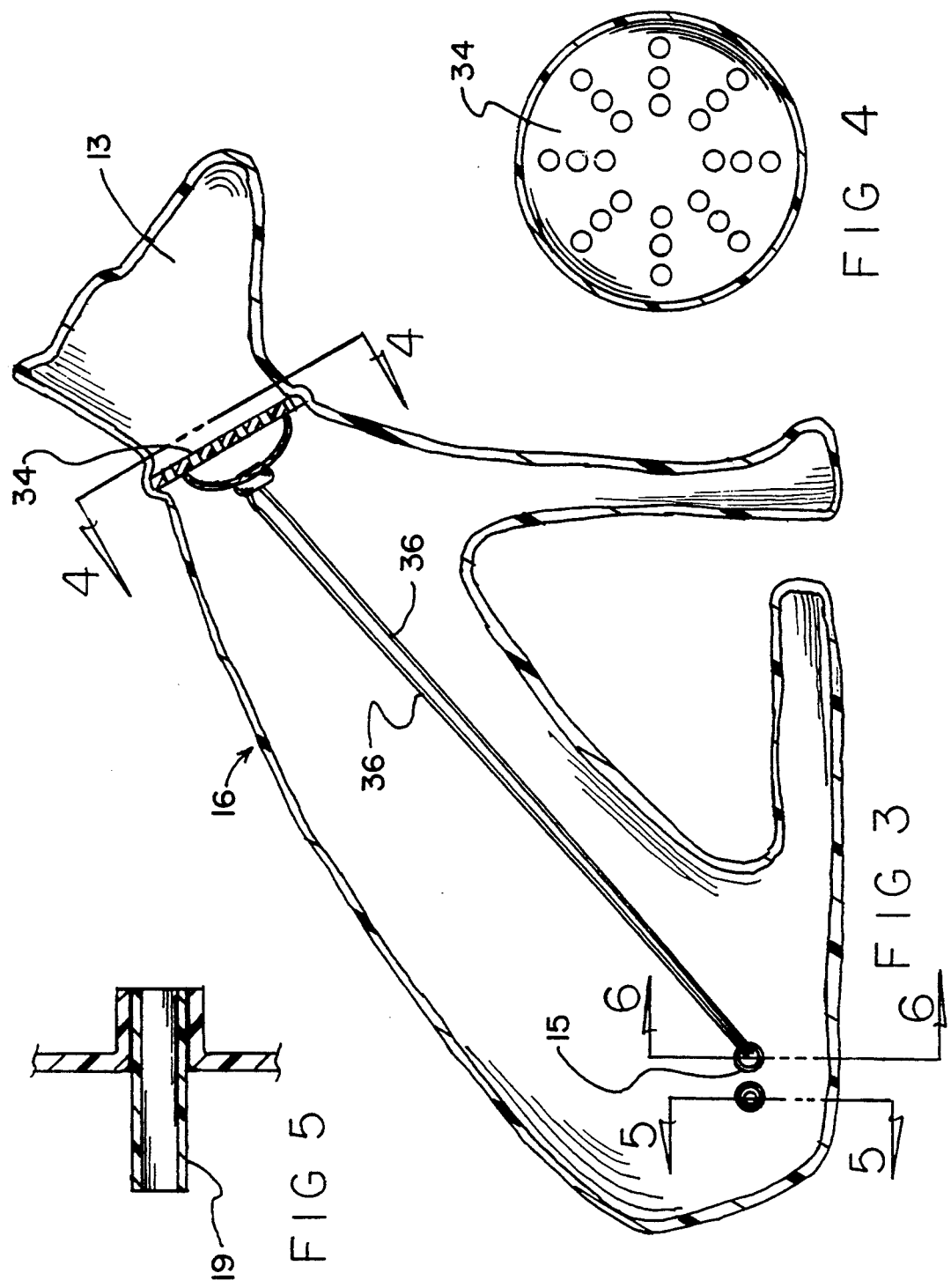

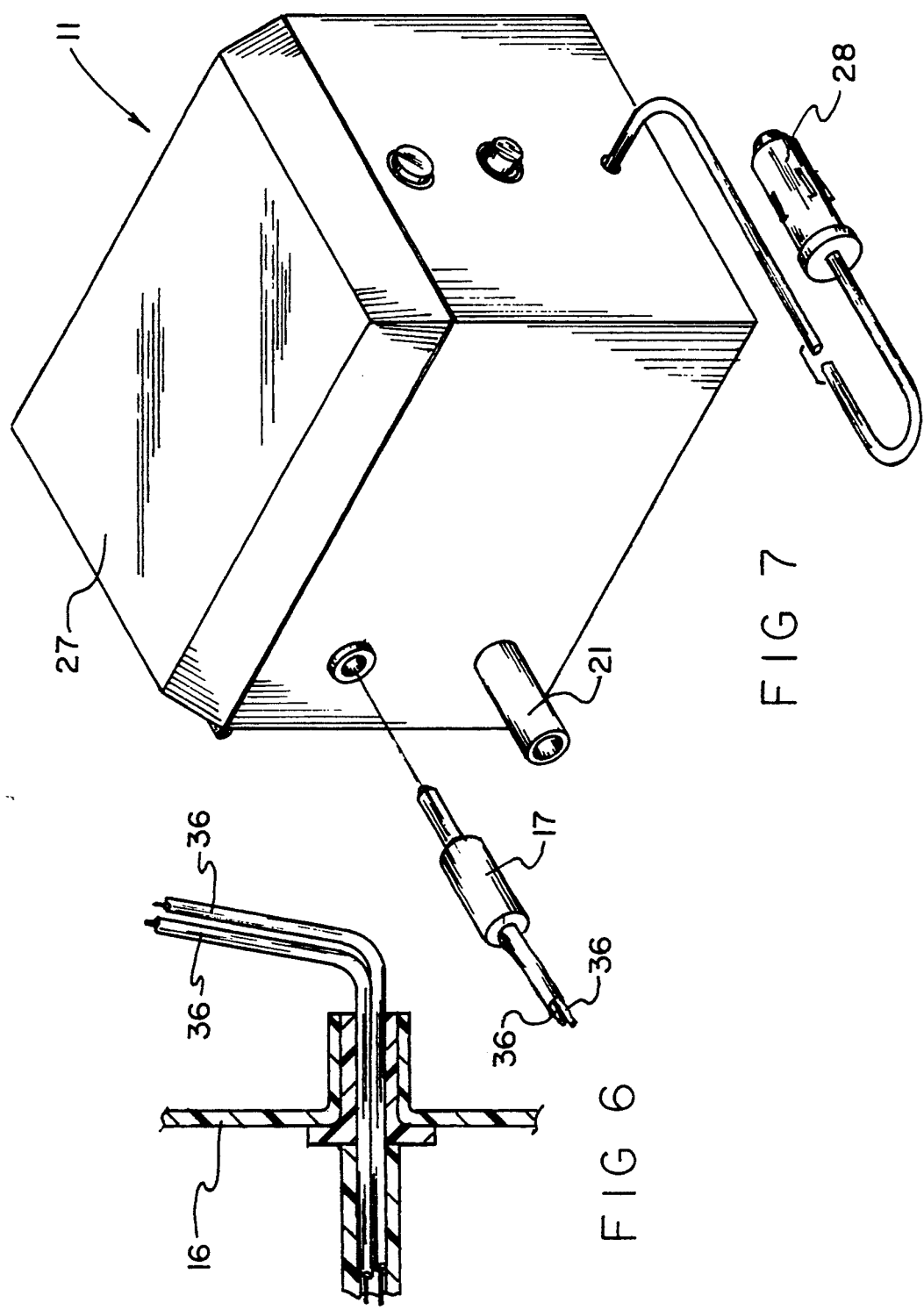

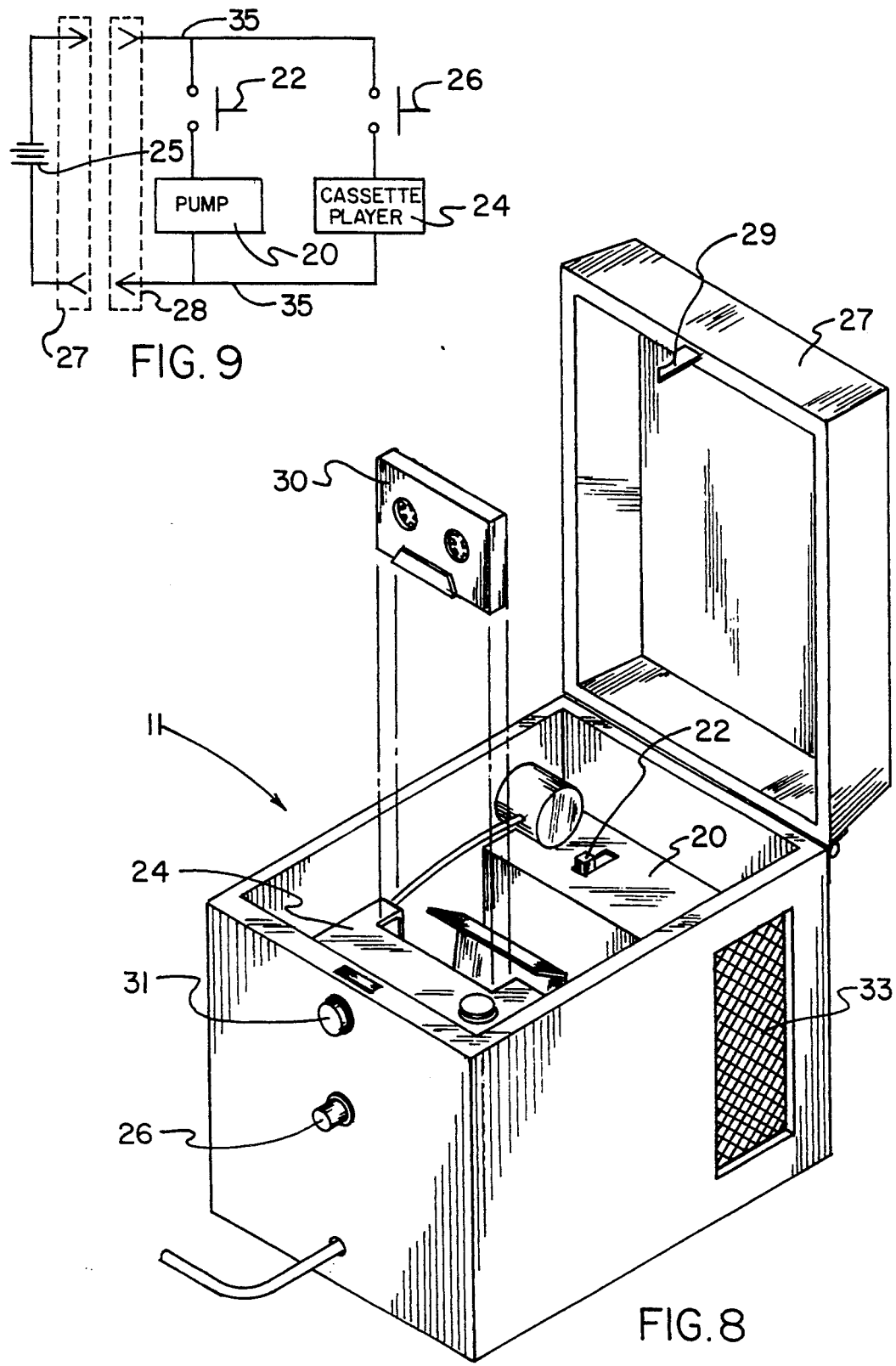

INFLATABLE SECURITY MANNEQUIN

BACKGROUND OF THE INVENTION

Field of the Invention

The present invention relates generally to security and protection devices, and more particularly, to a security and protection device to be carried along as a passenger in a motor vehicle.

Description of the Prior Art

Each day millions of individual motorists drive their motor vehicles alone, without anyone else in the motor vehicle. Being the only person in the motor vehicle has always been more risky than being accompanied by a passenger, either a human or an animal such as a dog. Especially in high crime areas or in areas susceptible to carjackings, having a passenger along is deemed to provide protection to the driver. A passenger deters crime in two ways: being a witness to a potential crime; and contributing physical power to thwart an attack.

In spite of the advantages of having a passenger along, for many reasons, many motorists do not carry a passenger with them as they drive. In this respect, it would be desirable if a motorist could carry a device along in the motor vehicle that could make up for the lack of a passenger. Further, in this respect, it would be desirable if a motorist could carry along in the vehicle a device which could deter crime by simulating the presence of a passenger.

Loud or threatening sounds often deter criminals who prefer stealth and silence in order to carry out crimes. Quiet prevents attention from being directed to a crime in progress. On the other hand, loud noises or loud words carrying threats or pleas for help destroy the quiet and the stealth and deter a crime from proceeding beyond an initial stage. In this respect, it would be desirable if a device were provided that could provide loud noises or threatening words to deter a criminal from proceeding with a criminal act.

In view of the above, it would be desirable if a device were provided which could both be carried along as a simulated passenger in a motor vehicle and provide loud noises or threatening words to deter crime.

Although, as stated above, there are times when it would be desirable to carry along a simulated passenger, there are other times when a real passenger would be present, and there is no longer a need for a simulated passenger. At such times, it would be desirable to be able to readily place the simulated passenger in storage or to reduce the size of the simulated passenger so as to take up little space and not be readily visible. Yet it would also be desirable if the simulated passenger could be used again, when necessary, with little trouble or little difficulty in assembly. In this respect, a way to provide a simulated passenger that can be readily used, placed in storage taking up little space, and reused again without assembly problems is to provide an inflatable simulated passenger.

Inflatable life-like figures are well known in the art. For example, the following U.S. Pat. Nos. disclose inflatable figures: 3,672,083 of Moran; 4,055,020 of Kosicki et al; 4,259,805 of Hornsby; 4,837,958 of Radovich; and 4,895,546 of Rakonjac. Yet, these inflatable devices are for amusement or decorative purposes only. None of these devices serves a purpose for personal protection or security. None of these devices provides loud or threatening sounds or words to deter crime. In this respect, it would be desirable if an inflatable simulated passenger would be provided that provides threatening sounds or words to deter crime.

Thus, while the foregoing body of prior art indicates it to be well known to use inflatable amusement devices, the provision of a simple and cost effective inflatable, life-like security and protection device is not contemplated. Nor does the prior art described above teach or suggest that a motorist could carry a device along in the motor vehicle that could make up for the lack of a passenger. Also, the prior art does not provide a device which could deter crime by simulating the presence of a passenger. The prior art does not disclose a device that provides loud noises or threatening words to deter a criminal from proceeding with a criminal act. In addition, the prior art does not provide a device that can both be carried along as a simulated passenger and provide loud noises or threatening words to deter crime. The prior art does not provide an inflatable simulated passenger that provides threatening sounds or words to deter crime. The foregoing disadvantages are overcome by the unique inflatable, sound-emitting guard apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved crime deterring apparatus, in the form of a simulated living creature such as a human or a dog or other animal, for use by an operator in a structure, such as a motor vehicle, having a window. The apparatus includes an inflatable member capable of being supported by a support in the structure, such as a seat in the motor vehicle, and capable of being seen from outside the structure through the window. The inflatable member is in the form of a simulated living creature. An electrically powered air pump is provided for inflating the inflatable member. A switch, under operator control, is provided for activating the air pump. An electrically powered device is provided for emitting sound, and, under operator control, a switch is provided for activating the sound-emitting device. The air pump and the sound-emitting device include a plug which is adapted to fit into a cigarette lighter in a motor vehicle. The sound-emitting device includes recorded-sound media, such as a cassette tape, a cassette player, and a speaker. The speaker is housed in the inflatable member, and the cassette tape player is housed in a box separate from the inflatable member. More specifically, the box houses the air pump, the cassette player, and the operator-controlled switches for the air pump and the cassette player. The operator-controlled switch for activating the cassette player includes a pushbutton, momentary contact switch. A potential perpetrator of a criminal act may be deterred from committing the act by seeing and hearing the apparatus of the invention.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursors inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved inflatable, sound-emitting guard apparatus which has all of the advantages of the prior art and none of the disadvantages.

It is another object of the present invention to provide a new and improved inflatable, sound-emitting guard apparatus which may be easily and efficiently manufactured and marketed.

It is a further object of the present invention to provide a new and improved inflatable, sound-emitting guard apparatus which is of durable and reliable construction.

An even further object of the present invention is to provide a new and improved inflatable, sound-emitting guard apparatus which is susceptible of a low cost of manufacture with regard to both materials and labor, and which accordingly is then susceptible of low prices of sale to the consuming public, thereby making such inflatable, sound-emitting guard apparatus available to the buying public.

Still yet a further object of the present invention is to provide a new and improved inflatable, sound-emitting guard apparatus that a motorist can carry along in a motor vehicle that can make up for the lack of a passenger being present in the motor vehicle.

Still another object of the present invention is to provide a new and improved inflatable, sound-emitting guard apparatus which can deter crime by simulating the presence of a passenger.

Still another object of the present invention is to provide a new and improved inflatable, sound-emitting guard apparatus which can be readily reduced in size by deflation and readily brought back to normal size by inflation.

Yet another object of the present invention is to provide a new and improved inflatable, sound-emitting guard apparatus that can provide loud noises or threatening words to deter a criminal from proceeding with a criminal act.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the alcove objects as well as objects other than those set forth above will become more apparent after a study of the following detailed description thereof. Such description makes reference to the annexed drawing wherein:

FIG. 1 is a perspective view showing a first preferred embodiment of the inflatable, sound-emitting guard apparatus of the invention in the form of a human male in place in a passenger seat of a motor vehicle.

FIG. 2 is a perspective view showing a second preferred embodiment of the inflatable, sound-emitting guard apparatus of the invention in the form of a guard dog.

FIG. 3 is an enlarged cross-sectional view of the embodiment of the inflatable, sound-emitting guard apparatus of FIG. 2 taken along line 3—3 thereof.

FIG. 4 is a cross-sectional view of the embodiment of the inflatable, sound-emitting guard apparatus of the invention shown in FIG. 3 taken along the line 4—4 thereof.

FIG. 5 is a cross-sectional view of the embodiment of the inflatable, sound-emitting guard apparatus of the invention shown in FIG. 3 taken along the line 5—5 thereof.

FIG. 6 is a cross-sectional view of the embodiment of the inflatable, sound-emitting guard apparatus of the invention shown in FIG. 3 taken along the line 6—6 thereof.

FIG. 7 is a perspective view of a master unit of the embodiment of the inflatable, sound-emitting guard apparatus shown in FIG. 2 with the cover closed.

FIG. 8 is a perspective view of the master unit of the embodiment of the inflatable, sound-emitting guard apparatus shown in FIG. 7 with the cover open.

FIG. 9 is an electrical schematic diagram showing the electrical arrangement of major electrical components of contained in the master unit shown in FIG. 8.

DESCRIPTION OF THE PREFERRED EMBODIMENT

With reference to the drawings, a new and improved inflatable, sound-emitting guard apparatus embodying the principles and concepts of the present invention will be described.

Turning initially to FIG. 1, there is shown a first exemplary embodiment of the inflatable, sound-emitting guard apparatus of the invention generally designated by reference numeral 10.

The inflatable, sound-emitting guard apparatus 10 of the invention is a crime deterring apparatus for use by an operator in a structure (e.g. motor vehicle 12) having a window 14. The apparatus 10 includes an inflatable member 16 capable of being supported by a support (e.g. seat 18) in the motor vehicle 12 and capable of being seen from outside the motor vehicle 12 through the window 14.

A box 11 is provided to house components which are shown in greater detail in FIGS. 6–9 which relate to the second embodiment of the invention shown in FIGS. 2–9.

More specifically, as in FIGS. 8 and 9 the box 11 includes an electrically powered means (e.g. air pump 20) for inflating the inflatable member 16 and first switch 22, under operator control, for activating the air pump 20. The box 11 also includes an electrically powered means (e.g. cassette player 24 and speaker 34) for emitting sound, and a second switch (e.g. momentary, push-button switch 26), under operator control, for activating the cassette player 24. The electrically powered air pump 20 and the electrically powered cassette player 24 include a common power plug 28 adapted to fit into a cigarette lighter in the passenger compartment of the motor vehicle 12.

The cassette player 24 plays cassettes 30 and sends electrical signals to speaker 34. A pair of electrical conductors 36 connect the speaker 34 to the cassette player 24.

Turning to FIGS. 2 through 9, a second embodiment of the inflatable, sound-emitting guard apparatus 10 of the invention is shown. Reference numerals are shown that correspond to like reference numerals that designate like elements shown in the other figures. In FIG. 2, the inflatable, sound-emitting guard apparatus 10 of the invention includes an inflatable member 16 that is in the form of a dog, wherein the speaker 34 is supported in the inflatable member 16 near the head 13. Wires 36 are connected to the speaker 34 and run through a sealed hole 15 in the inflatable member 16 to a plug 17, shown in FIG. 7, for connection to box 11 and the cassette player 24 therein.

An inflation tube 19 is provided in the inflatable member 16 and is connected to a compressed air output tube 21 shown in FIG. 7 via a piece of flexible tubing (not shown).

As shown in FIG. 8, box 11 has a lid 27 and a latch 29 that engages a complementary lock 31. A side of the box 11 has a screened vent 33 for cooling and ventilating the air pump 20.

As shown in FIG. 9, electrical power is provided by the motor vehicle battery 25 through the cigarette lighter connector 27, to the power plug 28, through wires 35, to the air pump 20 and the cassette player 24. First switch 22, under operator control, is used to activate the air pump 20. Second switch 26, under operator control, is used to activate the cassette player 24.

By virtue of the fact that the inflatable member 16 is inflatable, deflatable, and inflatable again, the inflatable, sound-emitting guard apparatus of the invention can be easily stored, in a deflated condition, without taking up much space. When the apparatus is needed again, it can readily be inflated again.

Although, the inflatable, sound-emitting guard apparatus 10 of the invention has been shown in the context of a motor vehicle 12, the invention can also be used in other environments. For example, an dog-like embodiment of the invention can be used in a home, being supported on a chair or the like near a window that is visible from outside the house.

The embodiments described above in detail derive their electrical power from a cigarette lighter connection in a motor vehicle. Alternatively, the inflatable, sound-emitting guard apparatus of the invention can be powered by batteries, such as rechargeable batteries, and the apparatus will thereby be self-contained and can be carried and used virtually anywhere.

The inflatable member can be made from durable materials such as Mylar that is often used in balloons. The air pump and the cassette player can be selected from a number of off the shelf air pumps and cassette players that are powered by DC power such as is present at the cigarette lighter connection of a motor vehicle. The speaker can be any speaker suitable for working with the cassette player selected.

The content of the cassettes can be varied. For use with a dog-like inflatable member, the cassettes can include sounds of a vicious dog barking or growling. The dog-like figure can be made to growl or bark anytime the operator presses the momentary contact, push-button switch 26.

Alternately, an inflatable member 16 that simulates a human can be used with cassettes containing threatening words or screams for help.

It is apparent from the above that the present invention accomplishes all of the objects set forth by providing a new and improved inflatable, sound-emitting guard apparatus that is low in cost, relatively simple in design and operation, and which may advantageously be used by a lone driver to deter commission of criminal acts by others while the driver is alone in the car.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A crime deterring apparatus for use by an operator in a structure having a window, said apparatus comprising:
    an inflatable member capable of being supported by a support in the structure and capable of being seen from outside the structure through the window;
    electrically powered means for inflating said inflatable member;
    means, under operator control, for activating said inflating means;
    electrically powered means for emitting sound; and
    means, under operator control, for activating said sound-emitting means.

2. The apparatus described in claim 1 wherein said electrically powered inflating means and said electrically powered sound-emitting means include a plug adapted to fit into a cigarette lighter in a motor vehicle.

3. The apparatus described in claim 1 wherein said inflating means includes an electrically powered air pump.

4. The apparatus described in claim 1 wherein said sound-emitting means includes a recorded-sound medium, means for playing said medium, and a speaker.

5. The apparatus described in claim 4 wherein said recorded- sound medium includes a cassette tape and said means for playing said recorded-sound medium includes a cassette tape player.

6. The apparatus described in claim 5, further including electrical conductor means for connecting said speaker to said cassette player, wherein:
   said speaker is housed in said inflatable member; and
   said cassette tape player is housed in a box separate from said inflatable member.

7. The apparatus described in claim 1 wherein said electrically powered means for inflating said inflatable member; said means, under operator control, for activating said inflating means; said electrically powered means for emitting sound; and said means, under operator control, for activating said sound-emitting means are housed in a box separate from said inflatable member.

8. The apparatus described in claim 1 wherein said operator-controlled means for activating said sound-emitting means includes a push-button switch.

9. The apparatus described in claim 1 wherein said operator-controlled means for activating said sound-emitting means includes a momentary contact switch.

10. The apparatus described in claim 1 wherein said sound-emitting means includes a speaker located near the head of an inflatable member in the form of a dog.

11. The apparatus described in claim 1 wherein said inflatable member is in the form of a living creature.

12. The apparatus described in claim 1 wherein said inflatable member is in the form of a human being.

13. The apparatus described in claim 1 wherein said inflatable member is in the form of a dog.

* * * * *